May 22, 1923.
N. W. CUMMINS
COUPLING
Filed May 29, 1920
1,456,179
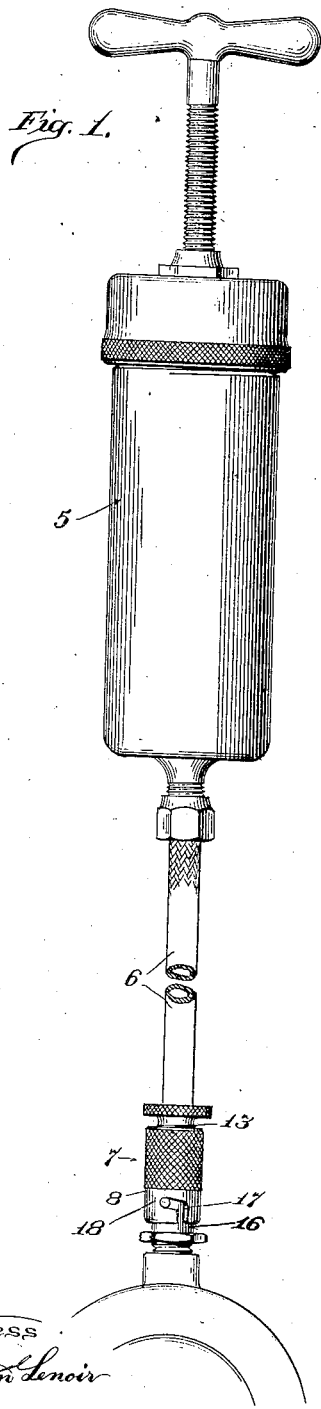
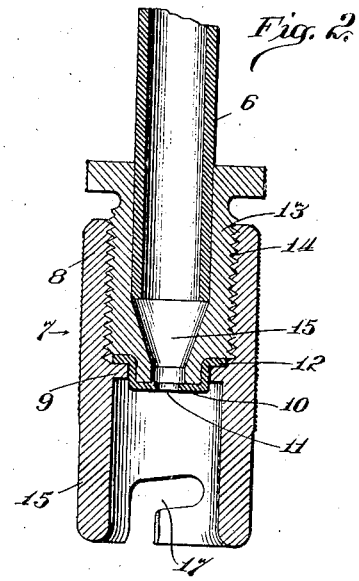
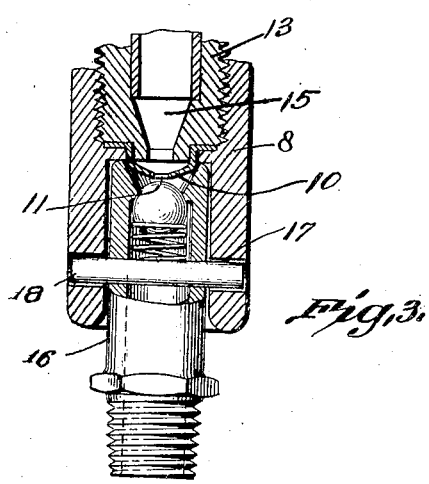
Inventor
Norman W. Cummins Patented May 22, 1923.

1,456,179

UNITED STATES PATENT OFFICE.

NORMAN W. CUMMINS, OF BRIDGEPORT, CONNECTICUT, ASSIGNOR TO THE BASSICK MANUFACTURING COMPANY, OF CHICAGO, ILLINOIS, A CORPORATION OF DELAWARE.

COUPLING.

Application filed May 29, 1920. Serial No. 385,151.

*To all whom it may concern:*

Be it known that I, NORMAN W. CUMMINS, a citizen of the United States, residing at Bridgeport, in the county of Fairfield and State of Connecticut, have invented a certain new and useful Improvement in Couplings, of which the following is a full, clear, concise, and exact description, reference being had to the accompanying drawings, forming a part of this specification.

My invention relates to an improvement in couplings, and is especially concerned with the provision of a novel coupling to be used in connection with lubricating means such as that discussed in the patent of Arthur V. Gullborg, No. 1,307,734 of June 24, 1919. This patent discloses a coupling member designed to be secured to any bearing which it is desired to lubricate, and a lubricant pump or compressor having a flexible discharge conduit, the free end of which is provided with a coupling member adapted to be detached or secured to the first mentioned coupling member, the two coupling members comprising means for sealing the joint between the coupling members so as to prevent the escape of lubricant under pressure.

The objects of my present invention are:

First: to provide a novel type of coupling comprising a coupling member to be secured to a bearing, and a coupling member to be secured to the discharge conduit of a lubricant compressor, comprising co-acting means for sealing the joint between the two coupling members and of such simple construction as to be economically manufactured.

Second: to provide a novel type of coupling member to be secured to the discharge conduit of a lubricant compressor, comprising a single gasket for sealing the joint between it and the coupling members adapted to be secured to bearings to be lubricated, and at the same time sealing the joint between two detachable portions of the coupling member secured to the lubricant compressor, and Third: to provide a coupling member adapted to co-act with the coupling member of a lubricant compressor and of such construction as to compensate for any variations in dimensions of either of the coupling members to insure a tight joint between these coupling members.

Other objects will appear as this description progresses, reference being had to the accompanying drawings in which—

Figure 1 is a side elevation of my improved coupling showing it in use for connecting a lubricant compressor with a bearing, Figure 2 is a central longitudinal section through my improved coupling member, which is adapted to be secured to the free end of the discharge conduit of a lubricant compressor, and Figure 3 is a side elevation of a coupling member adapted to co-act with the coupling member shown in Figure 2, but designed to be attached to a bearing.

Referring to the drawings, reference character 5 indicates the barrel of a lubricant compressor which may be of any suitable design. This compressor is provided with a flexible discharge conduit 6, to the end of which my improved coupling member, which I shall designate as a whole by the reference character 7, is secured. This coupling member comprises a tubular member 8, the bore of which is constricted intermediate its ends to provide an annular shoulder 9. A cup-shaped gasket 10, having an aperture 11 through the bottom thereof, is seated in the constricted portion of the bore of the coupling surrounded by the shoulder 9, and its edge is provided with a flange 12 adapted to rest against one side of the shoulder 9. The flange 12 of the gasket is clamped against the shoulder 9 by means of a gland or follower 13 having screw-threaded engagement as indicated at 14 with one end of the tubular member 11. The follower 13 is soldered or otherwise secured to the free end of the discharge conduit 6 and its bore is tapered as shown at 15 to a diameter only slightly larger than that of the aperture 11 in the bottom of the cup gasket.

The end of the tubular member, opposite the screw-threaded end, is provided with a bore 15 of substantially the same diameter as that of the coupling member 16 and is adapted to receive the coupling member. The walls of this end of the tubular member 8 are provided with a pair of bayonet joint slots 17 (only one of which is shown) for receiving the opposite ends of the pin 18, which extends through the coupling member 16, designed to be secured to a bearing to be lubricated. It will be noted that the inner end of the slot 17 is inclined slightly so that when the two coupling members are brought together and rotated relative to each other, the slot and pin 18 will act to clamp the end of the coupling members 16 tightly against the bottom of the cup gasket 10.

When the compressor 5 is actuated to force lubricant through the coupling members under pressure, that portion of the cup leather immediately surrounding the opening 11 will be held against the adjacent end of the coupling member 16 by the pressure of the lubricant, thereby effectually sealing the joint between the two coupling members.

It will be noted from the above description that the gasket 10 serves not only to seal the joint between the two coupling members but also to seal the joint between the tubular member 8 and the follower 13 by reason of which it is unnecessary to take any particular precautions to make a tight screw-threaded connection between the tubular member 8 and the follower 13, thus consequently cheapening the cost of production. It will also be noted that the follower 13. extends through the restricted portion of the bore formed by the shoulder 9 for the purpose of supporting the bottom of the cup gasket 10 against the pressure exerted on it by the adjacent end of the coupling member 16.

While I have described the details of the preferred embodiment of my invention, it is to be clearly understood that my invention is not limited to these details but is capable of other adaptations and modifications within the scope of the appended claims.

Having thus described my invention, what I claim is:—

1. A coupling member comprising a tubular member, the bore of which is constricted intermediate its ends to form an annular shoulder, a cup-shaped flexible gasket seated in said constricted portion with its bottom lying in a plane beyond said constricted portion, and provided with an aperture, the edge of said gasket being provided with a flange resting against said shoulder, and a follower having screw-threaded engagement with said tubular member for holding said flange against said shoulder, the inner end of said follower being provided with an extension extending through said constricted portion of the bore, and supporting the bottom of said gasket, the said follower being provided with a bore larger than the aperture in the bottom of said gasket.

2. A coupling member, comprising a tubular member, the bore of which is constricted intermediate its ends to form an annular shoulder, a cup-shaped flexible gasket seated in said constricted portion with its bottom lying in a plane beyond said constricted portion, and provided with an aperture, the edge of said gasket being provided with a flange resting against said shoulder and a follower for holding said flange against said shoulder, the inner end of said follower being provided with an extension extending through said constricted portion of the bore and supporting the bottom of said gasket, the said follower being provided with a bore, registering with the aperture in the bottom of said gasket.

3. A coupling member, comprising a tubular member, the bore of which is constricted intermediate its ends to form an annular shoulder, a cup-shaped flexible gasket seated in said constricted portion with its bottom lying in a plane beyond said constricted portion, and provided with an aperture, the edge of said gasket being provided with a flange resting against said shoulder and a follower for holding said flange against said shoulder, the inner end of said follower being provided with an extension extending through said constricted portion of the bore, the said follower being provided with a bore, registering with the aperture in the bottom of said gasket.

4. A coupling member, comprising a tubular member, the bore of which is constricted intermediate its ends to form a shoulder, a cup-shaped gasket seated in the constricted portion of said bore, and means for rigidly supporting and holding the bottom of said gasket in a plane beyond said constricted portion, said bore outwardly beyond the bottom of said gasket being unobstructed to permit the introduction of another coupling member to contact with the bottom of said gasket.

In witness whereof, I hereunto subscribe my name this 30th day of April, 1920.

NORMAN W. CUMMINS.

Witnesses:
IRENE M. CAUDEL,
RAYMOND G. MOORE.